No. 816,236. PATENTED MAR. 27, 1906.
R. D. KLINE.
TRANSPLANTING DEVICE.
APPLICATION FILED SEPT. 21, 1905.
2 SHEETS—SHEET 1.
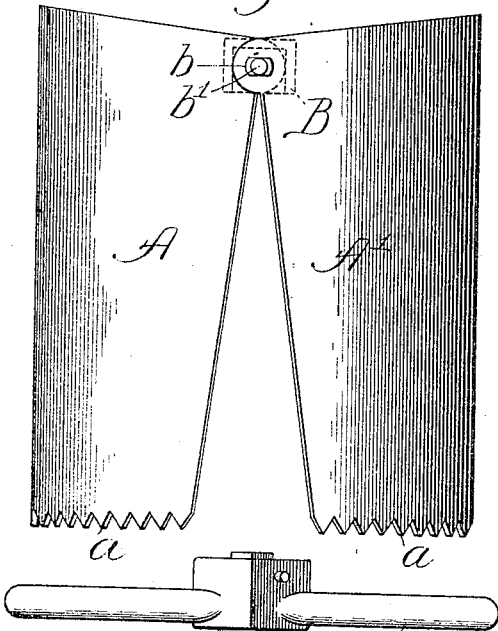
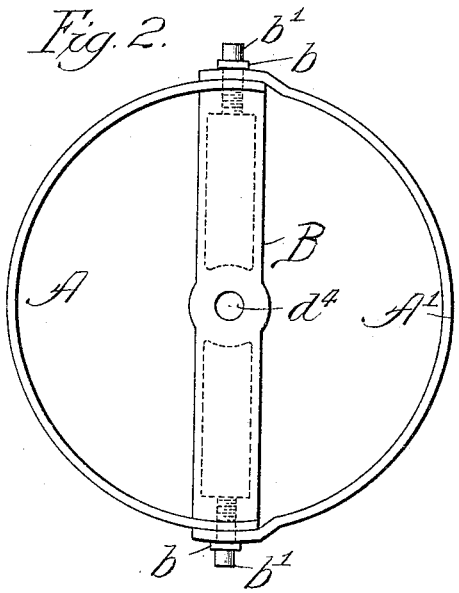
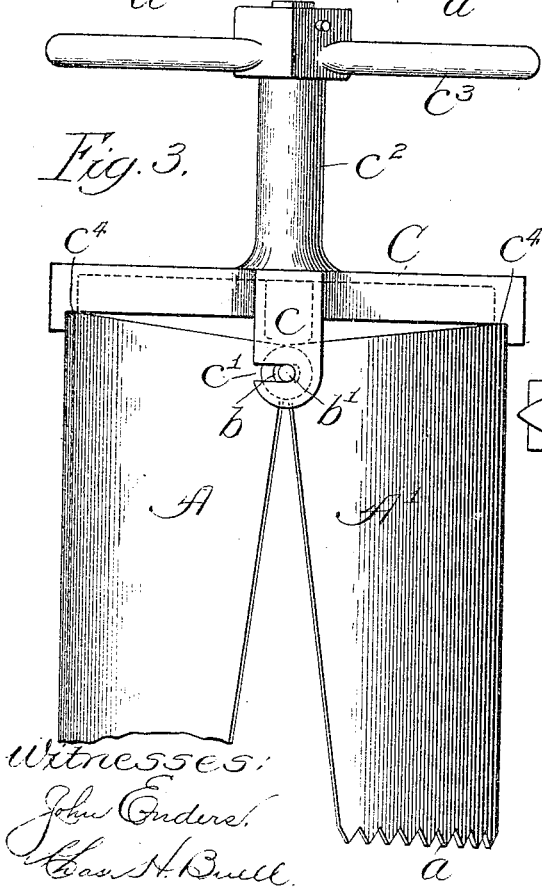
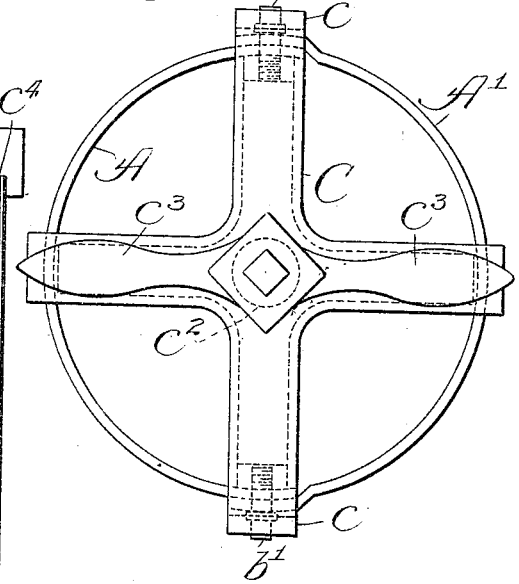
Witnesses:
John Enders
Chas. H. Bull
Inventor.
Rudolph D. Kline,
By Dyrenforth, Dyrenforth & Lee,
Attys.

No. 816,236. PATENTED MAR. 27, 1906.
R. D. KLINE.
TRANSPLANTING DEVICE.
APPLICATION FILED SEPT. 21, 1905.

2 SHEETS—SHEET 2.

Witnesses:
John Enders
Chas. H. Buell

Inventor:
Rudolph D. Kline,
By Dyrenforth, Dyrenforth & Lee,
Attys.

UNITED STATES PATENT OFFICE.

RUDOLPH D. KLINE, OF STREATOR, ILLINOIS.

TRANSPLANTING DEVICE.

No. 816,236.      Specification of Letters Patent.      Patented March 27, 1906.

Application filed September 21, 1905. Serial No. 279,401.

*To all whom it may concern:*

Be it known that I, RUDOLPH D. KLINE, a citizen of the United States, residing at Streator, in the county of Lasalle and State of Illinois, have invented a new and useful Transplanting Device, of which the following is a specification.

My invention relates particularly to devices for use in taking up plants for transplanting purposes; and my primary object is to provide a simple and effective device adapted to produce an annular hole about the plant and then to grasp the core thus formed for the purpose of extracting it.

The invention is illustrated in its preferred embodiment in the accompanying drawings, in which—

Figure 5:
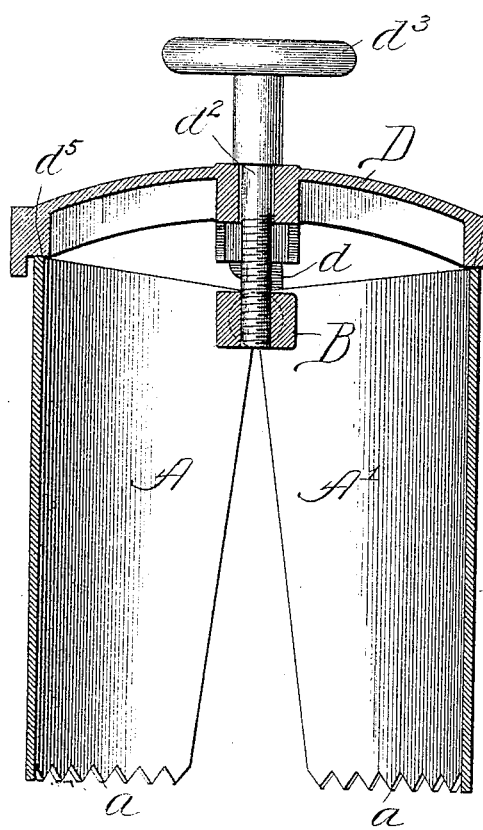

Figure 1 represents an elevational view of the blades of my improved device and a connecting member; Fig. 2, a plan view of the same; Fig. 3, an elevational view with the handle employed for rotating the blades applied; Fig. 4, a plan view of the same; Fig. 5, a sectional view showing a different form of handle applied to the blades for the purpose of forcing the lower ends thereof together to grasp the core, and Fig. 6 an elevational view of the device as shown in Fig. 5 with the blades forced together.

Figure 6:
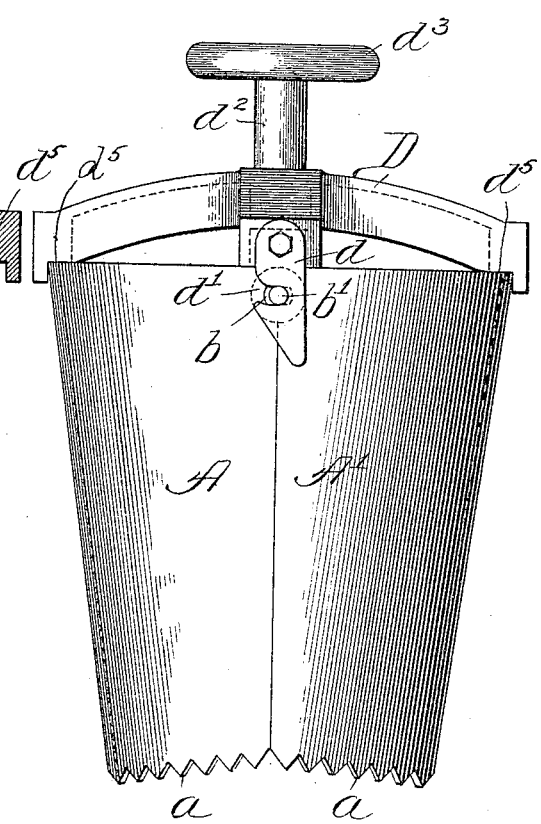

In the preferred construction the device comprises a pair of blades A A', each approximately of half-cylindrical form and provided at its lower end with teeth $a$, a bar B, equipped at its extremities with bolts $b$, upon which the blades are pivotally supported, the bolts having projecting ends $b'$, a cross-shaped member C, resting upon the upper ends of the blades and equipped at the extremities of its two arms with rigid depending lugs $c$, having lateral notches $c'$, the central portion of the cross bearing an upwardly-projecting stem $c^2$, equipped with a handle $c^3$, and a member D, adapted to replace the member C, as illustrated in Figs. 5 and 6. The member D may be cross-shaped, as shown, and two of its arms are equipped with depending pivotally-supported lugs $d$, having lateral notches $d'$ adapted to engage the studs $b'$. Through the center of the member D extends a bolt $d^2$, equipped at its upper end with a wheel or handle $d^3$ and having its lower end threaded and extending into a threaded perforation $d^4$, with which the member B is provided, as shown in Fig. 2.

As shown, the blades A A' are provided at their meeting edges with overlapping pivotal lugs, which are slotted to receive the bolts $b$.

As shown, the member C is provided with bearings $c^4$ at the extremities of two of its arms, which bearings rest upon the curved upper portions of the blades. Similarly the member D is provided with bearings $d^5$. The blades are cut away at their vertical edges, so that when open the adjacent edges converge, as shown in Fig. 1. This enables the blades to be closed, as shown in Fig. 6, when the screw $d^2$ is turned, thereby raising the member B.

It will now be understood that the device when assembled as shown in Fig. 3 may be employed auger fashion to bore an annular hole in the earth, and when organized as shown in Fig. 5 may be employed to lift the core thus formed from its place.

Changes in details of construction are contemplated. Hence no undue limitation should be understood from the foregoing detailed construction.

What I regard as new, and desire to secure by Letters Patent, is—

1. An apparatus for the purpose set forth, comprising a plurality of blades movable toward each other, a handle for rotating said blades about the axis of the device to form a core, and a second handle adapted to replace the first-named handle for moving the blades toward each other to grip the core and enable it to be removed.

2. The combination of a pair of curved blades pivotally supported at their upper ends, and a handle having a bearing upon the upper ends of the blades and having means for causing the blades to rotate with the handle, for the purpose set forth.

3. The combination of a pair of pivotally-connected curved blades, a member supported on said blades and equipped with means detachably connected with the blades for effecting rotation thereof, and a handle connected with said member, for the purpose set forth.

4. An apparatus for the purpose set forth, comprising a pair of half-cylindrical blades pivotally connected at their upper portions and cut away at their adjacent edges, a bar pivotally connected with said blades and extending across the axis of the device, a rotating handle applied to the blades for rotating the device about its axis to form a core, and a handle adapted to replace said first-named handle and equipped with means for lifting upon the blades at their points of pivotal connection and pressing downwardly upon the blades at points removed from said points of pivotal connection, for the purpose set forth.

5. The combination of a pair of pivotally-connected blades and a member having bearings upon the upper ends of the blades at points removed from the pivotal connections of the blades and equipped with means for applying turning force to the blades at their points of pivotal connection, for the purpose set forth.

6. The combination of a pair of curved blades having at the upper ends of their adjacent edges pivot perforations, a bar equipped with pivots and provided centrally with a threaded perforation, a member adapted to rest upon the blades and equipped with a bolt having threaded connection with said bar, and pivoted links carried by said last-named member having recesses engaging said pivots, for the purpose set forth.

RUDOLPH D. KLINE.

In presence of—
A. U. THORIEN,
J H. LANDES.